US007275513B2

(12) United States Patent
Nonogaki et al.

(10) Patent No.: US 7,275,513 B2
(45) Date of Patent: Oct. 2, 2007

(54) ENGINE COVER

(75) Inventors: Haruhiko Nonogaki, Aichi-ken (JP); Itsuro Maeda, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 196 days.

(21) Appl. No.: 11/231,926

(22) Filed: Sep. 22, 2005

(65) Prior Publication Data

US 2006/0070599 A1 Apr. 6, 2006

(30) Foreign Application Priority Data

Oct. 1, 2004 (JP) ............................ 2004-290148

(51) Int. Cl.
*B60R 13/08* (2006.01)

(52) U.S. Cl. .............................. 123/195 C; 123/198 E

(58) Field of Classification Search ............ 123/195 C, 123/195 R, 198 E
See application file for complete search history.

(56) References Cited

U.S. PATENT DOCUMENTS 4,027,644 A * 6/1977 Timour .................. 123/198 E
5,746,168 A * 5/1998 Lochbrunner et al. ... 123/90.38
5,896,837 A * 4/1999 Nysten et al. ........... 123/90.38
6,206,604 B1 * 3/2001 Dembowsky et al. ....... 403/135
7,082,919 B2 * 8/2006 Nonogaki et al. ...... 123/198 E
7,175,183 B2 * 2/2007 Des Places et al. ......... 277/598
7,216,622 B2 * 5/2007 Marks et al. ........... 123/195 C
2005/0217634 A1 * 10/2005 Nonogaki et al. ...... 123/198 E

FOREIGN PATENT DOCUMENTS

JP A-2001-98554 4/2001
JP A-2004-204709 7/2004

* cited by examiner

*Primary Examiner*—Marguerite McMahon
(74) *Attorney, Agent, or Firm*—Posz Law Group, PLC

(57) ABSTRACT

An engine cover includes an installation member, a cover body, and an installed member. The installation member is disposed on an engine. One of the installation member and the installed member includes a leg, and a head, and the other one of them includes a framed member, and an elastic member. The elastic member includes a first hole, a second hole, and a diametrically-enlarged intermediate hole. The head engages with the diametrically-enlarged intermediate hole. Moreover, the head is disposed movably toward the second hole when a downward load is applied to the cover body, thereby bringing the cover body closer to the engine.

7 Claims, 3 Drawing Sheets

ENGINE COVER

BACKGROUND OF THE INVENTION

1. Field of the Invention

The present invention relates to an engine cover for covering engines. In particular, it relates to a construction for installing an engine cover to engines.

2. Description of the Related Art

In the engine rooms of recent automobiles, it is general to dispose an engine cover above the engine and below the bonnet hood. The engine cover has a function of shielding noises emitted out from the engine (or transmission sounds) as well as a function of upgrading the decorativeness in the engine room by shielding the engine visually.

In general, an engine cover is installed to the cylinder head cover of an engine. In this instance, the engine cover is usually installed to the cylinder head cover by means of fastening with screw bolts, for example, as disclosed in Japanese Unexamined Patent Publication (KOKAI) No. 2001-98,954. An engine cover disclosed in the publication is provided with through holes. A cylinder head cover, to which the engine cover is installed, is provided with threaded holes at positions corresponding to the through holes of the engine cover. When installing the engine cover to the cylinder head cover, screw bolts are fitted into the through holes of the engine cover from above, and are screwed into the threaded holes of the cylinder head cover. Thus, the fastening force exerted between the screw bolts and the threaded holes fastens the engine cover to the cylinder head cover.

However, it has been required recently to give automobiles a function of protecting pedestrians by reducing the shocks which automobiles exert pedestrians in collisions with human beings. For this purpose, the bonnet hood of an automobile is formed so as to deform in collisions with human beings, and the resulting deformation absorbs the shocks in collisions, in general.

In order to fully absorb the shocks in collisions by means of the bonnet hood's deformation, it is necessary to secure a space for permitting the bonnet hood to deform between the bonnet hood and the engine cover by placing the engine cover and the cylinder head cover close to each other in the up/down direction. However, when fastening the conventional engine cover to the cylinder head cover with the screw bolts as described above, the distance between the engine cover and the cylinder head cover might be enlarged because the length of the screw bolts determines the distance. Accordingly, there might arise a problem that it is difficult to provide the space for permitting the bonnet hood to deform to a satisfactory size.

A technology has been developed for solving the problem. In such a technology, an engine cover descends upon collisions, and approaches an engine, thereby securing a space for permitting a bonnet hood to deform between the bonnet hood and the engine cover, as disclosed in Japanese Unexamined Patent Publication (KOKAI) No. 2004-204,709, for example.

The conventional engine cover disclosed in Japanese Unexamined Patent Publication (KOKAI) No. 2004-204,709 comprises a collar, which is installed to a cylinder head cover, and a hollow member which is formed hollow and in which a fluid is sealed. Moreover, the collar is installed to the engine cover by way of the hollow member. The hollow member intervenes in the space between the cylinder head cover and the engine cover, and contacts elastically with them. Thus, the cylinder head cover and the engine cover are separated from each other.

Upon collisions, the collar fractures, the fractured collar breaks through the hollow member, and the fluid filled in the hollow member flows out. Accordingly, the fluid buffers the shocks resulting from collisions. Moreover, when the fluid filled in the hollow member flows out, the hollow member contracts so that the engine cover descends to approach the engine cover. Consequently, it is possible to secure a space for permitting a bonnet hood to deform between the bonnet hood and the engine cover.

However, the engine cover might be associated with a problem that the manufacturing cost goes up, because it requires many expensive component parts, such as the fracturable collar upon being subjected to a predetermined load, and the hollow member in which a fluid is filled.

SUMMARY OF THE INVENTION

The present invention has been developed in view of the aforementioned circumstances. It is therefore an object of the present invention to provide an engine cover, which can be manufactured inexpensively, and which can provide a space for permitting a bonnet hood to deform between the bonnet hood and the engine cover satisfactorily.

An engine cover according to the present invention can achieve the aforementioned object, and comprises:

- an installation member disposed on an engine, and extending upward from the engine;
- a cover body formed as a plate shape substantially; and
- an installed member disposed on the cover body, extending downward from the cover body, and being assembled with the installation member, thereby holding the cover body above the engine;
- one of the installation member and the installed member comprising a leg having a leading end with a predetermined diameter, and a head formed at the leading end of the leg and having a diameter larger than the diameter of the leg;
- the other one of the installation member and the installed member comprising a framed member having a hollow therein and an opened end formed at a leading end thereof, and an elastic member being fitted into the hollow of the framed member to engage with the framed member;
- the elastic member formed hollow, and comprising a first hole opening to the opened end of the framed member, a second hole extending coaxially with the first hole and opening oppositely with respect to the first hole, and a diametrically-enlarged intermediate hole connecting the first hole with the second hole and being enlarged diametrically than the first hole and the second hole;
- the installation member and the installed member being assembled in such a manner that an outer peripheral surface of the head engages with an inner peripheral surface of the diametrically-enlarged intermediate hole; and
- the head being disposed movably toward the second hole when a downward load is applied to the cover body, thereby bringing the cover body closer to the engine.

In the present engine cover, the head can preferably have an outside diameter D1, and the second hole can preferably have an inside diameter D2; and the outside diameter D1 and the inside diameter D2 can preferably satisfy a relational expression, $D2/D1 \leqq 0.75$.

In the present engine cover, the load for moving the head toward the second hole can preferably be 2,000 N or less.

In the present engine cover, the outside diameter D1 of the head and the inside diameter D2 of the second hole can preferably further satisfy a relational expression, 0.2≦D2/D1, when they satisfies the relational expression, D2/D1≦0.75.

The present engine cover can produce a satisfactory space between itself and a bonnet food, because the cover body approaches the engine when the cover body is subjected to a downward load, that is, in collisions. Accordingly, the present engine cover can provide a space between itself and the bonnet hood, space which is adapted for permitting the bonnet hood to deform satisfactorily. Specifically, when the deforming bonnet cover interferes with the present engine cover to apply a load of 2,000 N or less to the engine cover, the cover body approaches the engine to secure a space for permitting the bonnet hood to deform satisfactorily. Consequently, it is possible to absorb the shocks in collisions, because the present engine cover allows the bonnet hood to deform satisfactorily.

The present engine cover is installed to the engine in the following manner. The head, a constituent member of one of the installation member and installed member, engages with the inner peripheral surface of the diametrically-enlarged intermediate hole in the elastic member, a constituent member of the other one of the installation member and installed member. When the present engine cover is subjected to loads, that is, in collisions, the head goes through the diametrically-enlarged intermediate hole, or the elastic member deforms to elongate around the diametrically-enlarged intermediate hole so that the head moves toward the second hole of the elastic member. Accordingly, the cover body of present engine cover approaches the engine. Thus, the present engine cover comprises the installation member disposed on the engine and the installed member disposed on the cover body, installation member and installed member which have simplified constructions, respectively. Consequently, the present engine cover can be manufactured inexpensively.

Moreover, the present engine cover produces an advantage of making the installation operation easier, because it can be installed to the engine by simply engaging the installation member with the installed member.

In the present engine cover, when the outside diameter D1 of the head and the inside diameter D2 of the second hole satisfy a relational expression, D2/D1≦0.75, the present engine cover can be held to the engine stably, that is, the present engine cover can demonstrate high assembly stability, because the head hardly goes through the diametrically-enlarged intermediate hole even when the present engine cover is subjected to minor loads resulting from vibrations during travelling, for example. On the other hand, when the outside diameter D1 of the head and the inside diameter D2 of the second hole satisfy a relational expression, 0.2≦D2/D1, the present engine cover can securely produce the space for permitting the bonnet hood to deform in collisions, that is, the present engine cover can demonstrate high pedestrian-protective performance, because no excessive load is needed to let the head go through the diametrically-enlarged intermediate hole in order to approach the cover body the engine. Moreover, when the outside diameter D1 and the inside diameter D2 satisfy a relational expression, 0.2≦D2/D1≦0.75, the present engine cover can satisfy both high pedestrian-protection performance and high assembly stability at the same time.

Note that it is advisable that the load for moving the head toward the second hole can be 2,000 N or less in order to give the present engine cover much better pedestrian-protective performance.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
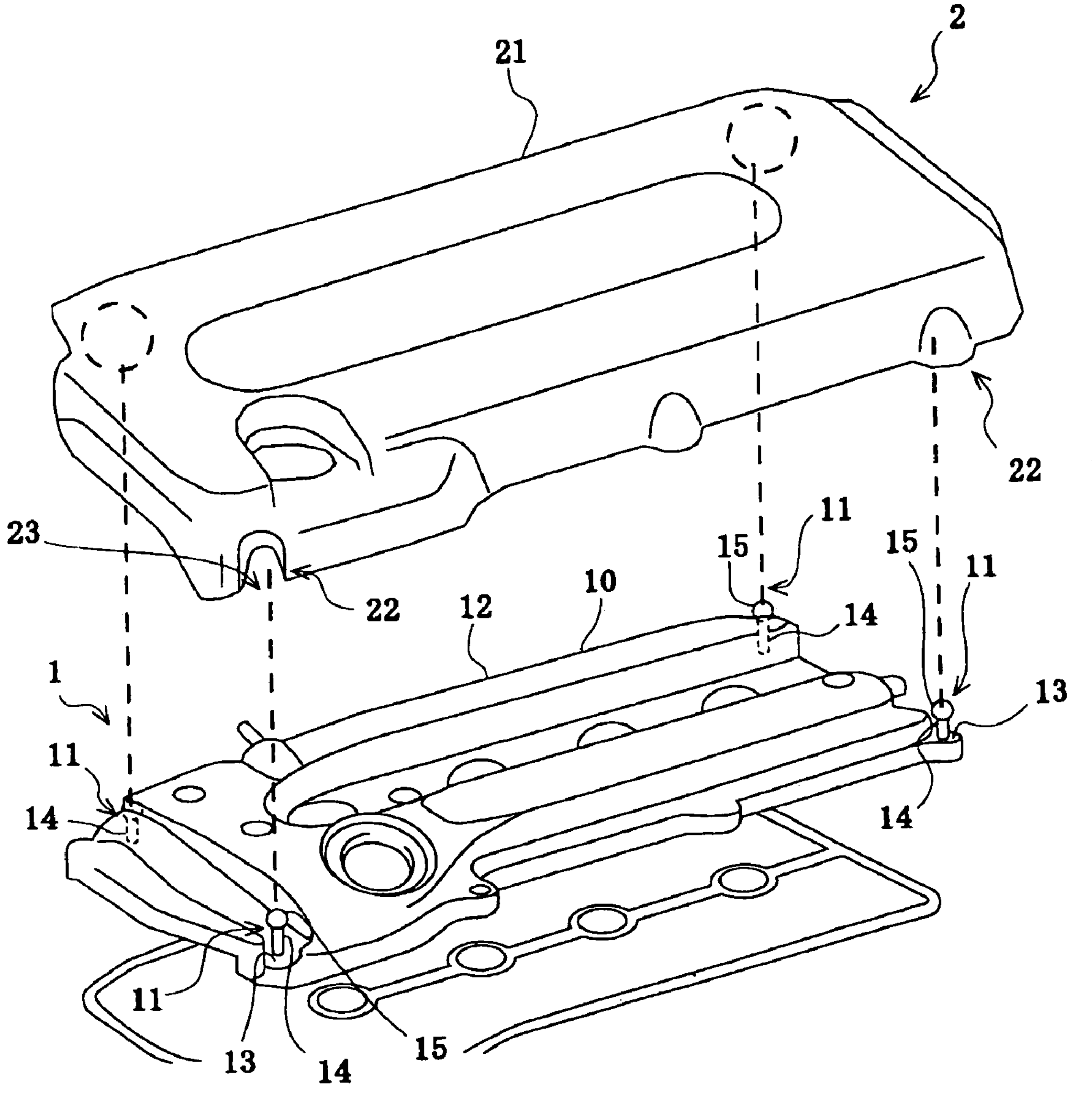
FIG. 1 is an exploded perspective diagram for schematically illustrating an engine cover according to Example No. 1 of the present invention.

Having generally described the present invention, a further understanding can be obtained by reference to the specific preferred embodiments which are provided herein for the purpose of illustration only and not intended to limit the scope of the appended claims.

An engine cover according to the present invention comprises an installation member, a cover body, and an installed member. The cover body is formed as a plate shape substantially, and is disposed above the engine.

In the present specification, the term "engine" is a generic term which includes not only engines per se comprising cylinders and pistons, but also engine components, such as cylinder head covers for covering the cylinder head of engines, devices for supplying fuels and air to engines, cam devices for controlling the suction and exhaust of engines, and devices for circulating lubricants in engines. In the present engine cover, the cover body is held to certain parts of the engine, and is thereby placed above the engine. The cover body can cover the engine partially, or can cover the engine entirely. When the cover body covers the engine partially, parts of the engine, which the cover body does not cover, can be disposed even above the cover body.

In the present engine cover, the installation member is disposed on the engine, and extends upward from the engine. Moreover, the installed member is disposed on the cover body, and extends downward from the cover body. One of the installation member and the installed member comprises a leg, and a head. The other one of the installation member and the installed member comprises a framed member, and an elastic member. Moreover, the elastic member is fitted into the hollow of the framed member, and simultaneously engages with the framed member. In addition, the elastic member comprises a first hole, a second hole, and a diametrically-enlarged intermediate hole. The head of one of the installation member and the installed member engages with the inner peripheral surface of the diametrically-enlarged intermediate hole of the elastic member. Thus, the installation member is assembled with the installed member. Specifically, the head is assembled with the framed member by way of the elastic member. Accordingly, the present engine cover does not require the fastening by screwing bolts when installing the cover body to the engine, contrary to the conventional engine cover disclosed in above-described Japanese Unexamined Patent Publication (KOKAI) No. 2001-98,954. Consequently, the present engine cover produces an advantage of enabling an assembly operator to install the cover body to the engine with ease.

The quantities of the installation member and installed member can be corresponding quantities to each other. The more the quantities of the installation member and installed member are, the more firmly the cover body can be fastened to the engine. On the contrary, the less the quantities of the installation member and installed member are, the more readily the cover body can be installed to the engine. When the present engine cover comprises a plurality of the installation members and installed members, each of the installation members can be formed as an identical shape, or can be formed as different shapes. The installed member can be formed likewise.

As far as the installation member is formed as such a shape that it extends to a position at which it is assembled with the installation member, the installation member can be disposed on the top surface of a cylinder head cover, one of the engine component parts, or can be installed to the side surface, for instance. Alternatively, the installation member can be disposed on engine component parts other than the cylinder head cover. Moreover, the installation member can preferably be disposed on the engine so that its leading end is disposed below the topmost surface of the engine. For example, the leading end of the installation member can desirably be disposed below the topmost surface of a cylinder head cover in order to securely produce a much larger space for permitting bonnets hood to deform, for the cover body can be much closer to the cylinder head cover in collisions, that is, the present engine cover can be separated more from bonnet hoods in collisions.

Note that the elastic member can further comprise a hollow, which is disposed on an outer side with respect to the first hole, second hole and diametrically-enlarged intermediate hole. However, when the elastic member is formed solidly on the outer side with respect to the first hole, second hole and diametrically-enlarged intermediate hole, such an elastic member produces an advantage of fastening the cover body firmly to the engine. On the other hand, in the above-described conventional engine cover disclosed in Japanese Unexamined Patent Publication (KOKAI) No. 2004-204,709, the conventional engine cover is installed to the cylinder head cover by way of the hollow member. The hollow member is likely to deform, because it is constructed so that a liquid or gas is sealed inside the core with a relatively thin thickness. Accordingly, the conventional engine cover might not be fastened firmly to the cylinder head cover, one of the engine component parts. Consequently, there might arise a fear that the moving conventional engine cover interferes with the other component parts disposed within an engine room. On the contrary, the present engine cover comprises the leg whose head engages with an inner peripheral surface of the diametrically-enlarged intermediate hole, one of the constituent elements of the elastic member. Moreover, the leg extending continuously from the head is held inside the first hole, another one of the constituent elements of the elastic member, which is positioned more below on the bottom opposite-opening-end side of the elastic member than the diametrically-enlarged intermediate hole. As a result, in the present engine cover, the cover body is fastened firmly to the engine. Note that, however, the cover body can be fastened more firmly to the engine when the elastic member is formed solidly on the outer side with respect to the first hole, second hole and diametrically-enlarged intermediate hole. Therefore, it is possible to more reliably inhibit such a drawback that the swinging cover body might interfere with the other component parts.

The elastic member can be formed of known elastic materials, such as rubber and elastomer. When the elastic member is formed of EPDM (i.e., ethylene-propylene diene monomer), CR (i.e., chloroprene rubber), NR (i.e., natural rubber) and TPO (i.e., thermoplastic olefin), a few examples of the known elastic materials, the elastic member can fasten the cover body firmly to the engine in vehicle's ordinary driving. Accordingly, it is possible to securely inhibit the drawback resulting from the swinging cover body. On the other, such an elastic member can deform fully in collisions so that the head can pass the diametrically-enlarged intermediate hole of the elastic member, that is, the head enters or passes the second hole of the elastic member, with ease. Moreover, it is possible to control the load for moving the head toward the second hole of the elastic member by enlarging the axial length of the second hole or changing the hardness of the elastic member.

EXAMPLES

Hereinafter, the present invention will be described in detail with reference to the accompanying drawings showing an engine cover according to an example of the present invention.

Example No. 1

Figure 2:
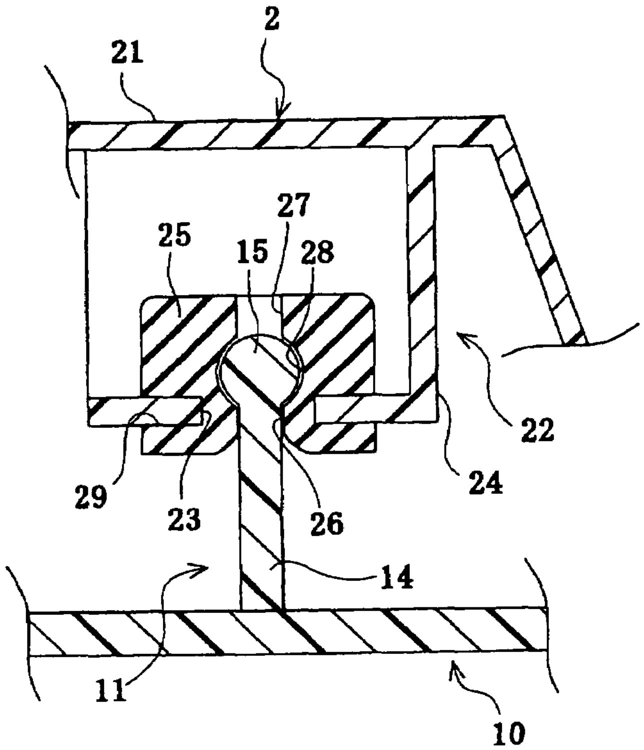
FIG. 2 is a cross-sectional diagram for schematically illustrating the engine cover according to Example No. 1 of the present invention.
Figure 3:
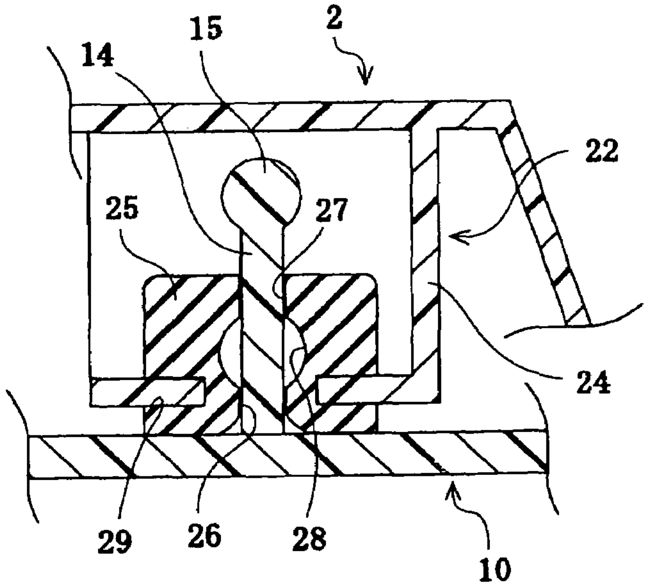
FIG. 3 is another cross-sectional diagram for schematically illustrating the engine cover according to Example No. 1 of the present invention.

An engine cover according to Example No. 1 of the present invention comprises a cover body, installation members, which include a leg and a head, respectively, and installed members, which include a framed member and an elastic member, respectively. FIG. 1 is an exploded perspective diagram for schematically illustrating the engine cover according to Example No. 1. FIGS. 2 and 3 are cross-sectional diagrams for schematically illustrating the engine cover according to Example No. 1, respectively.

Figure 4:
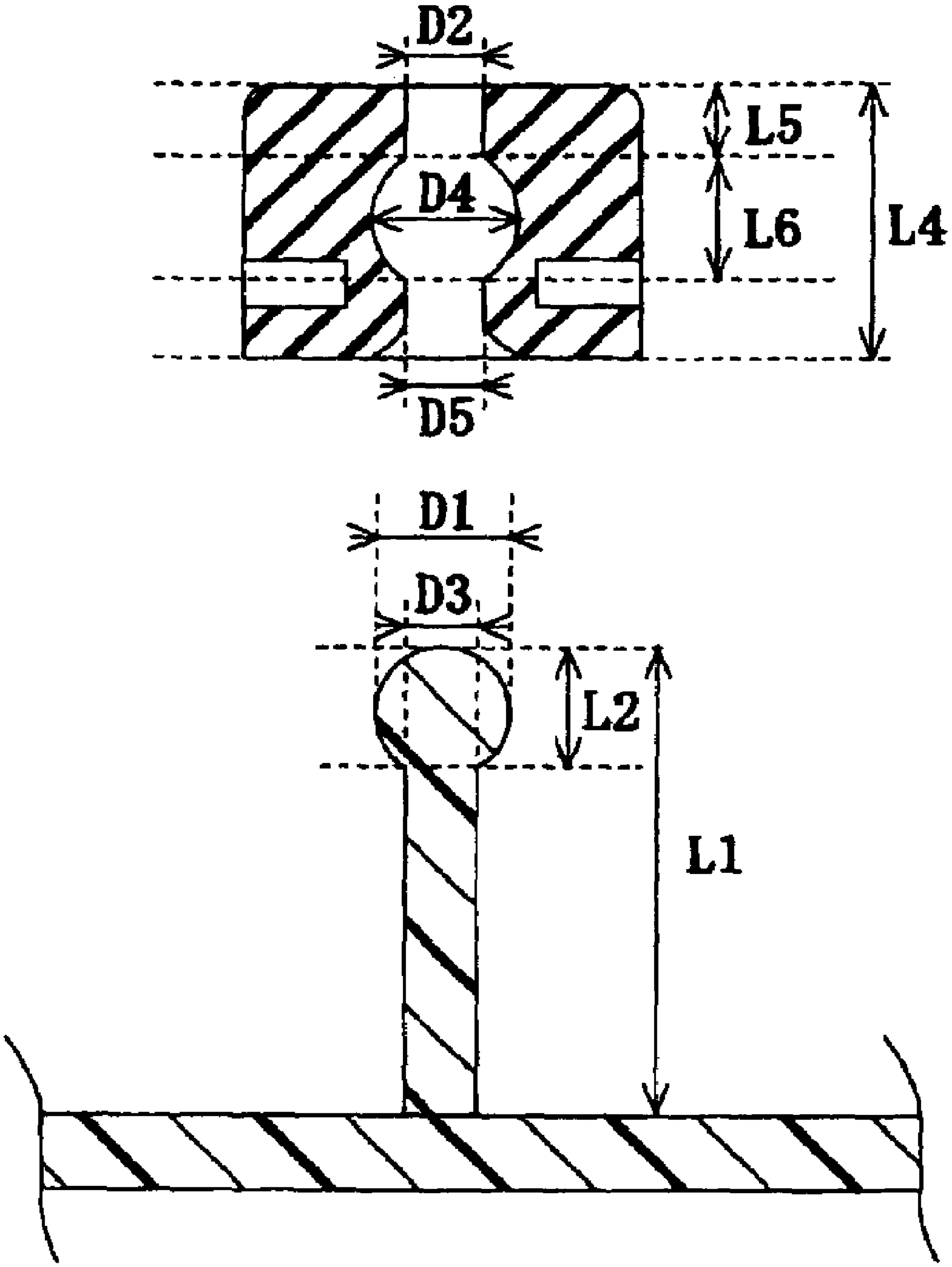
FIG. 4 is an explanatory cross-sectional diagram for illustrating the positions for measuring the dimensions of specific parts of the engine cover according to Example No. 1 of the present invention.

The engine cover according to Example No. 1 of the present invention comprises a cover body 2, installation members 11, and installed members 22. The installation members 11 are disposed on a cylinder head cover 10, one of the component parts of an engine 1. The cylinder head cover 10 comprises a primary portion 12, and peripheral portions 13. The primary portion 12 of the cylinder head cover 10 is formed as an inverted trough shape, whose top surface swells upward and whose opening faces downward, substantially. Note that neither the primary portion 12 of the cylinder head cover 10 nor the peripheral portions 13 include the installation members 11. The peripheral portions 13 of the cylinder head cover 10 are disposed at the four corners of the primary portion 12, which are depressed below the top surface of the primary portion 12. The installation members 11 extend upward from the peripheral portions 13, respectively. Specifically, as shown in FIGS. 2 and 3, the installation members 11 comprise a leg 14, and a head 15, respectively. The leg 14 is bonded to the peripheral portion 13, and extends upward therefrom. The head 15 is disposed at the leading end of the leg 14, is formed as a sphere shape, and has an outside diameter larger than that of the leg 14. Note that the heads 15 are disposed below the top surface of the primary portion 12, that is, the topmost surface of the cylinder head cover 10. For example, in the engine cover according to Example No. 1, the heads 15 had an outside diameter D1 of ϕ 8 mm, respectively; the legs 14 had an outside diameter D3 of ϕ 6 mm, respectively; the installation members 11 had an axial overall length L1 of 20 mm, respectively; and the heads 15 had an axial length L2 of 6.6 mm, respectively. For reference, FIG. 4 shows the measurement positions at which the dimensions of the respective parts were measured.

As shown in FIG. 1, the cover body 2 comprises a primary body 21, and the four installed members 22. The primary body 21 is formed as an inverted vat shape, whose opening faces downward, substantially. The installed members 22 are disposed at the four corners of the primary body 21, and extend downward therefrom, respectively. Note that the respective installed members 22 are formed as an identical shape substantially.

As shown in FIGS. 2 and 3, each of the installed members 22 comprises a framed member 24, and a block-shaped elastic member 25. The framed member 24 is formed as a substantially letter-"U" shape which is turned counterclockwise to lie horizontally in the drawing. Specifically, the framed member 24 is hollowed inside, has an opening 23 formed in the bottom wall, and is opened on one of the opposite sides, that is, on the left side in the drawing. Most of the elastic member 25 is disposed in the hollow framed member 24. Moreover, the elastic member 25 comprises a first hole 26, a second hole 27, and a diametrically-enlarged intermediate hole 28. The first hole 26 opens to the opening 23 of the framed member 24. The second hole 27 opens to the primary body 21 of the cover body 2. The diametrically-enlarged intermediate hole 28 connects the first hole 26 with the second hole 27. The first hole 26 and second hole 27 extend coaxially with each other. In addition, the diametrically-enlarged intermediate hole 28 has an inside diameter larger those of the first hole 26 and second hole 27. The first hole 26, second hole 27 and diametrically-enlarged intermediate hole 28 make a hollow, which extends in the up/down direction but enlarges diametrically at the diametrically-enlarged intermediate hole 28, in the elastic member 25. Note that, in the engine cover according to Example No. 1 of the present invention, the elastic member 25 was formed of CR which exhibited a Shore hardness of 70 approximately.

Moreover, the elastic member 25 further comprises an engagement groove 29 which is disposed on the lower outer peripheral surface to extend in the peripheral direction. In addition, the inner periphery of the framed member 24's opening 23 extends inwardly toward the bottom of the engagement groove 29. When assembling the elastic member 25 with the framed member 24, the elastic member 25 is placed inside the hollow framed member 24 through the left-side opening of the hollow framed member 24 in the drawing. Then, the elastic member 25 is press-fitted into the opening 23 of the framed member 24 while pressing the engagement groove 29 onto the inner periphery of the opening 23. When the assembly is completed, the engagement groove 29 of the elastic member 25 engages with the inner periphery of the framed member 24's opening 23 to hold the elastic member 25 to the framed member 24. Thus, the upper part of the elastic member 25 above the engagement groove 29 is fitted inwardly into the hollow framed member 24, and the lower part of the elastic member 25 below the engagement groove 29 is exposed downward under the opening 23 of the framed member 24.

For example, in the engine cover according to Example No. 1 of the present invention, the second holes 27 of the elastic members 25 had an inside diameter D2 of ϕ 6 mm, respectively; the diametrically-enlarged intermediate holes 28 of the elastic members 25 had an inside diameter D4 of ϕ 9 mm, respectively; the first holes 26 of the elastic members 25 had an inside diameter D5 of ϕ 7 mm, respectively; and the hollows of the elastic members 25, which the first holes 26, diametrically-enlarged intermediate holes 28 and second holes 27 made, had an axial overall length L4 of 23 mm, respectively. Note that the axial length L5 of the second hole 27 occupied 5 mm of the axial overall length L4; and the axial length L6 of the diametrically-enlarged intermediate hole 28 occupied 5.7 mm of the axial overall length L4. For reference, FIG. 4 shows the measurement positions at which the dimensions of the respective parts were measured. Thus, in the engine cover according to Example No. 1, the ratio of the inside diameter D2 of the installed member 22's second hole 27 to the outside diameter D1 of the installation member 11's head 15 was D2/D1=0.75.

The engine cover according to Example No. 1 of the present invention is installed to the cylinder head cover 10 in the following manner. First of all, the heads 15 of the installation member 11 are brought into contact with the installed members 22, that is, with the bottom ends of the elastic members 25's first holes 26 to position the installation members 11 to the installed members 22. Note herein that the bottom surfaces of the elastic members 25, that is, the inner peripheries of the first holes 26, are tapered from wide to narrow upward as a truncated-cone shape in the drawing. Accordingly, it is possible to position the heads 15 to the first holes 26 with ease and precisely. Then, the cover body 2 is pressed downward to press-fit the heads 15 of the installation members 11 into the first holes 26 of the installed members 22. When the heads 15 enter the diametrically-enlarged intermediate holes 28 through the first holes 26 and engage with the inner peripheral surfaces of the diametrically-enlarged intermediate holes 28, the installed members 22 are fastened to the installation members 11. Specifically, the diametrically-enlarged intermediate holes 28 have inner peripheral surfaces which are formed to conform to the outer peripheral surfaces of the heads 15, and the second holes 27, which extend coaxially with the first holes 26 and continue from the diametrically-enlarged intermediate holes 28, are formed to have the inside diameter D2 which is smaller than the outside diameter D1 of the heads 15. Consequently, the heads 15 are less likely to pass the diametrically-enlarged intermediate holes 28, and are less likely to enter the second holes 27. Therefore, the engine cover according to Example No. 1 is installed to the cylinder head cover 10 in the following fashion: the heads 15 of the installation members 11 are held inside the installed members 22, that is, inside the diametrically-enlarged intermediate holes 28 of the elastic members 25; and the legs 14 of the installation members 11 are held partially inside the installed members 22, that is, inside the first holes 26 of the elastic members 25, as illustrated in FIG. 2.

When the engine cover according to Example No. 1 of the present invention is subjected to downward loads in collision accidents, the installed members 22 of the cover body 2 try to move downward. Accordingly, the upper parts of the elastic members 25, specifically, the upper parts above the diametrically-enlarged intermediate holes 28, are pressed onto the heads 15 of the installation members 11. Since the second holes 27 are disposed above the diametrically-enlarged intermediate holes 28 in the elastic members 25, the heads 15 pass the diametrically-enlarged intermediate holes 28 to move toward the second holes 27, and eventually project beyond the second holes 27, as illustrated in FIG. 3. Consequently, the cover body 2 moves downward to approach the cylinder head cover 10. To put it differently, as the heads 15 of the installation members 11 pass the diametrically-enlarged intermediate holes 28 of the installed members 22's elastic members 25 and move toward the second holes 27, the distance between the cover body 2 and the cylinder head cover 10 diminishes, distance which is determined by the installation members 11 and installed members 22, the constituent parts of the engine cover according to Example No. 1. Therefore, the cover body 2 approaches the cylinder head cover 10.

When the cover body 2 approaches the cylinder head cover 10, a space for permitting a bonnet hood to deform satisfactorily is formed above the cover body 2. Thus, the bonnet hood can deform sufficiently. As a result, the bonnet hood thus deformed sufficiently absorbs shocks in collisions.

Note that, in the engine cover according to Example No. 1 of the present invention, the ends of the installation members 11, that is, the heads 15, are disposed below the topmost surface of the cylinder head cover 10. Accordingly, the distance between the cover body 2 and the cylinder head cover 10 further diminishes in collisions. Consequently, it is possible to secure a much larger space for permitting a bonnet hood to deform.

Moreover, when the engine cover according to Example No. 1 of the present invention is subjected to downward loads, the cover body 2 approaches the cylinder head cover 10, and eventually contacts with the cylinder head cover 10 to stop approaching. However, the cover body 2 can be stopped at a position where it is separated slightly away from the cylinder head cover 10. Note that the cover body 2 can be stopped in this manner, for example, by setting up the axial length of the legs 14, or the axial length of the second holes 27, appropriately. Thus, the cover body 2 can stop approaching the cylinder head cover 10 when the heads 15 are still held inside the second holes 27. In this instance as well, a space for permitting a bonnet hood to deform satisfactorily can be formed above the engine cover according to Example No. 1. Therefore, the bonnet hood thus deformed can sufficiently absorb shocks in collisions similarly.

Example No. 2

Except that an engine cover according to Example No. 2 of the present invention comprises the installed members 22 whose elastic members 25's second holes 27 have a different inside diameter D2 from the inside diameter D2 of those in the engine cover according to Example No. 1, the engine cover according to Example No. 2 comprises the same constituent parts as those of the engine cover according to Example No. 1. Specifically, in the engine cover according to Example No. 2, the second holes 27 had an inside diameter D2 of $\phi$ 5 mm; and accordingly the ratio of the inside diameter D2 of the second holes 27 to the outside diameter D1 of the heads 15 was D2/D1=0.625.

Example No. 3

Except that an engine cover according to Example No. 3 of the present invention comprises the installed members 22 whose elastic members 25's second holes 27 have a different inside diameter D2 from the inside diameter D2 of those in the engine cover according to Example No. 1, the engine cover according to Example No. 3 comprises the same constituent parts as those of the engine cover according to Example No. 1. Specifically, in the engine cover according to Example No. 3, the second holes 27 had an inside diameter D2 of $\phi$ 4 mm; and accordingly the ratio of the inside diameter D2 of the second holes 27 to the outside diameter D1 of the heads 15 was D2/D1=0.5.

Example No. 4

Except that an engine cover according to Example No. 4 of the present invention comprises the installed members 22 whose elastic members 25's second holes 27 have a different inside diameter D2 from the inside diameter D2 of those in the engine cover according to Example No. 1, the engine cover according to Example No. 4 comprises the same constituent parts as those of the engine cover according to Example No. 1. Specifically, in the engine cover according to Example No. 4, the second holes 27 had an inside diameter D2 of $\phi$ 2 mm; and accordingly the ratio of the inside diameter D2 of the second holes 27 to the outside diameter D1 of the heads 15 was D2/D1=0.25.

Collision Test

The engine covers according to Example Nos. 1 through 4 of the present invention were subjected to loads, which acted vertically downward to the cover bodies 2, in order to examine the magnitude of load for moving the cover bodies 2 downward.

First of all, the engine covers according to Example Nos. 1 through 4 of the present invention were placed on a testing bench, respectively. Using an Amthler universal testing machine, loads were applied gradually to the engine covers according to Example Nos. 1 through 4. In the meantime, the loads, at which the cover bodies 2 started moving downward, were measured continuously for the engine covers according to Example Nos. 1 through 4, respectively. According to the examination, the cover body 2 of the engine cover according to Example No. 1 started moving downward at a load of 78 N approximately; the cover body 2 of the engine cover according to Example No. 2 started moving downward at a load of 97 N approximately; the cover body 2 of the engine cover according to Example No. 3 started moving downward at a load of 120 N approximately; and the cover body 2 of the engine cover according to Example No. 4 started moving downward at a load of 232 N approximately. Note that, in all of the cover bodies 2 of the engine covers according to Example Nos. 1 through 4, the ratio of the inside diameter D2 of the second holes 27 to the outside diameter D1 of the heads 15 fell in a range, $0.2 \leqq D2/D1 \leqq 0.75$. Therefore, the following were apparent: the heads 15 of the installation members 11 could not pass through the diametrically-enlarged intermediate holes 28 of the installed members 22 at small loads; but no excessive load was required for the heads 15 to go beyond the diametrically-enlarged intermediate holes 28 and eventually enter or pass through the second holes 27 of the installed members 22, that is, no excessive load was required for the cover bodies 2 to approach the cylinder head cover 10. Thus, the engine covers according to Example Nos. 1 through 4 satisfied high protective performance for pedestrians and high assembly stability simultaneously.

Having now fully described the present invention, it will be apparent to one of ordinary skill in the art that many changes and modifications can be made thereto without departing from the spirit or scope of the present invention as set forth herein including the appended claims.

What is claimed is:

1. An engine cover, comprising:

an installation member disposed on an engine, and extending upward from the engine;

a cover body formed as a plate shape substantially; and an installed member disposed on the cover body, extending downward from the cover body, and being assembled with the installation member, thereby holding the cover body above the engine;

one of the installation member and the installed member comprising a leg having a leading end with a predetermined diameter, and a head formed at the leading end of the leg and having a diameter larger than the diameter of the leg;

the other one of the installation member and the installed member comprising a framed member having a hollow therein and an opened end formed at a leading end thereof, and an elastic member being fitted into the hollow of the framed member to engage with the framed member;

the elastic member formed hollow, and comprising a first hole opening to the opened end of the framed member, a second hole extending coaxially with the first hole and opening oppositely with respect to the first hole, and a diametrically-enlarged intermediate hole connecting the first hole with the second hole and being enlarged diametrically than the first hole and the second hole;

the installation member and the installed member being assembled in such a manner that an outer peripheral surface of the head engages with an inner peripheral surface of the diametrically-enlarged intermediate hole; and the head being disposed movably toward the second hole when a downward load is applied to the cover body, thereby bringing the cover body closer to the engine.

2. The engine cover set forth in claim 1, wherein:

the head has an outside diameter D1, and the second hole has an inside diameter D2; and the outside diameter D1 and the inside diameter D2 satisfy a relational expression, $D2/D1 \leqq 0.75$.

3. The engine cover set forth in claim 1, wherein:

the load for moving the head toward the second hole is 2,000 N or less.

4. The engine cover set forth in claim 2, wherein:

the outside diameter D1 and the inside diameter D2 further satisfy a relational expression, $0.2 \leqq D2/D1$.

5. The engine cover set forth in claim 1, wherein:

the engine has a topmost surface; and the installation member has a leading end, which is disposed below the topmost surface of the engine.

6. The engine cover set forth in claim 1, wherein:

the elastic member is formed solidly on an outer side with respect to the first hole, second hole and diametrically-enlarged intermediate hole.

7. The engine cover set forth in claim 1, wherein:

the engine comprises a cylinder head cover; and the installation member is disposed on the cylinder head cover.

* * * * *